Figure 1:
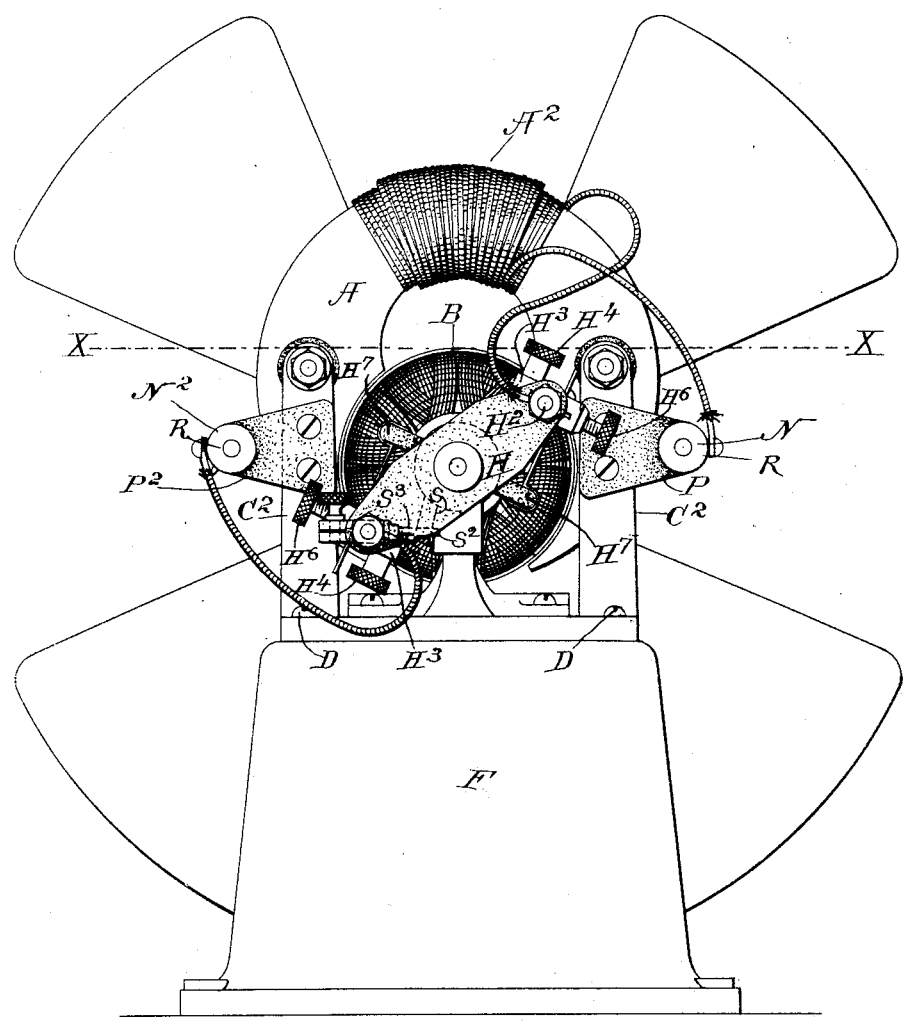

(No Model.) 3 Sheets—Sheet 2.
W. HOCHHAUSEN.
ALTERNATING CURRENT MOTOR.
No. 510,601. Patented Dec. 12, 1893.
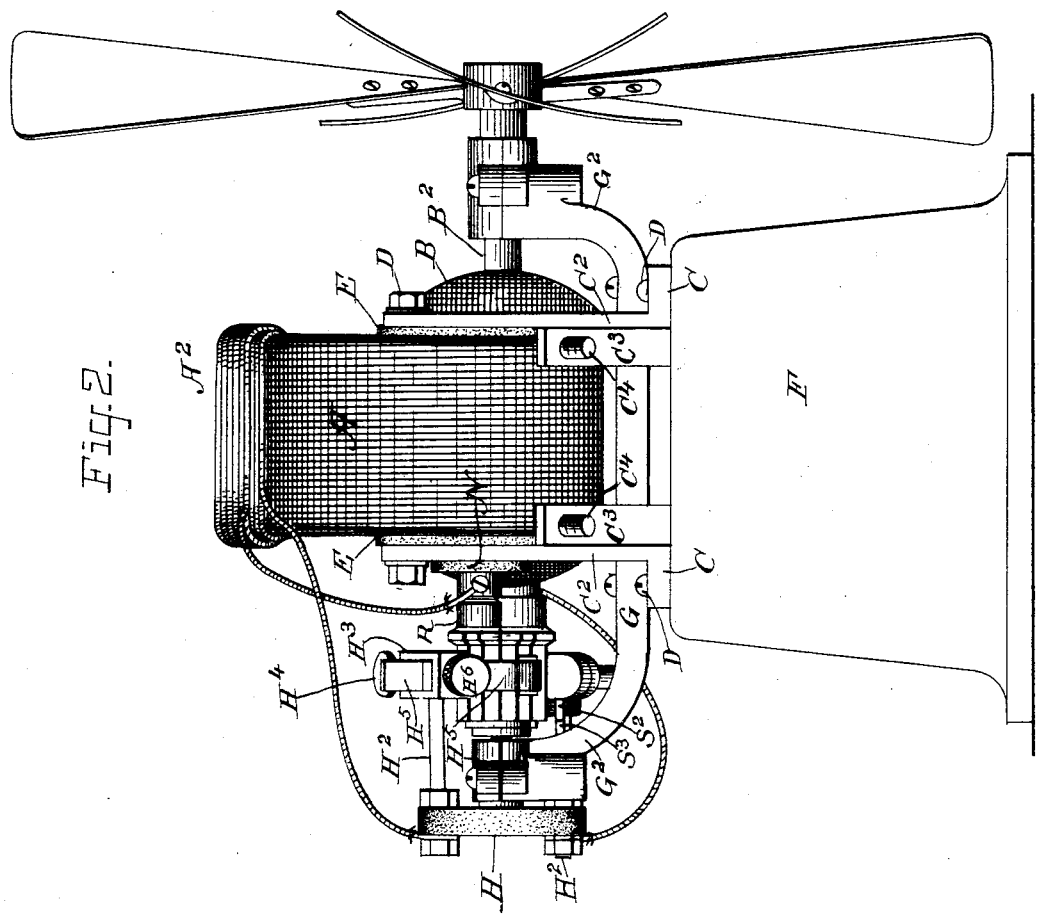

(No Model.) 3 Sheets—Sheet 3.
W. HOCHHAUSEN.
ALTERNATING CURRENT MOTOR.
No. 510,601. Patented Dec. 12, 1893.
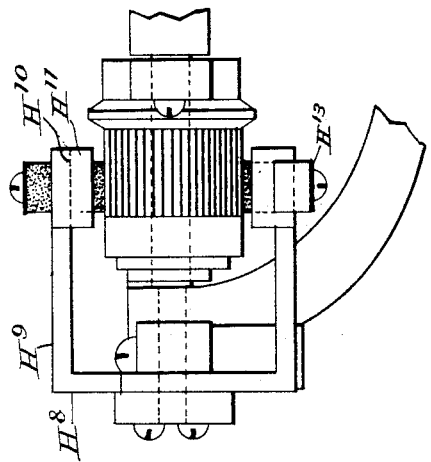
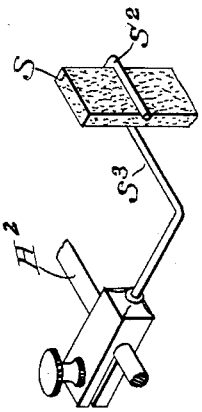
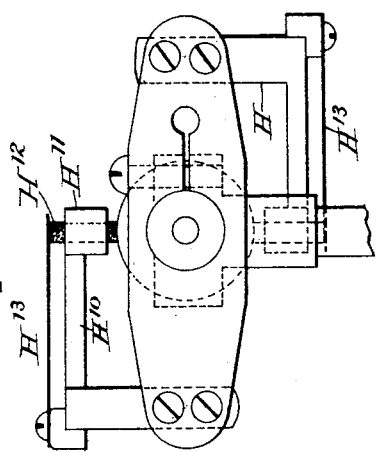
ATTEST:
J. A. Hindle
Wm H. Capel.
INVENTOR:
Wm Hochhausen
By H. C. Townsend
Attorney

UNITED STATES PATENT OFFICE.

WILLIAM HOCHHAUSEN, OF BROOKLYN, NEW YORK.

ALTERNATING-CURRENT MOTOR.

SPECIFICATION forming part of Letters Patent No. 510,601, dated December 12, 1893.

Application filed September 4, 1891. Serial No. 404,780. (No model.)

*To all whom it may concern:*

Be it known that I, WILLIAM HOCHHAUSEN, a citizen of the United States, and a resident of Brooklyn, in the county of Kings and State of New York, have invented a certain new and useful Alternating-Current Motor, of which the following is a specification.

My invention relates to alternating current electric motors and is designed to simplify the construction and increase the efficiency of that type of motor which is provided with a commutator and would, if run with a continuous current, have a constant torque in the same direction.

The invention consists in certain improvements in the methods of construction and the details of the device as hereinafter more particularly described and then specified in the claims. It is well known in the art that an electric motor having a commutator and constructed to have a continuous torque in the same direction in all positions of its armature may be run as an alternating current electric motor provided connections are properly made so that the currents flowing through the field and the armature shall alternate at the same time. Thus, a continuous current motor having an armature of the Gramme or Siemens type rotating between two or more poles will operate under the influence of alternating currents because, although at each alternation the poles of the armature may change their sign, the poles of the field magnets will also change their sign at the same time, and there will be a continuity of repulsion and attraction between the armature and field in the same direction. It is a well recognized fact that an ordinary continuous current motor run upon an alternating current circuit does not operate efficiently, the loss of efficiency being ordinarily attributed in greater part to hysteresis, but there is also a loss in the operation of the motor due to the fact that the alternations of field and armature magnetism will not take place at exactly the same time owing to the difference in retardation or lag of the field and armature. In the ordinary constructions of continuous current motors this difference of lag or retardation is very considerable the length of the field magnet being much greater than the length of the portion of magnetic circuit which in the armature requires to be reversed. There is also in ordinary continuous current motors a very considerable length of field magnet coil or a large number of turns thereof which have an effect tending to increase the retardation or counter electro-motive force in the field magnet portion of the circuit. Hence, when the motor is run on an alternating current circuit, the alternations of field magnetism tend to lag behind those of the armature. If the lag were sufficient to cause the magnetism of the field to be at its maximum while the current in the armature be at its minimum, it is obvious that comparatively little torque will result at the times when such relation of magnetism exists, while, if the field magnetism be retarded so that at its minimum the current shall flow or tend to flow at maximum amount in the armature, there will be a great loss owing to the fact that with a minimum field the counter electro-motive force of the motor will be at its least and a current will tend to flow through the armature in such degree as to heat the same without, however, acting effectively owing to the weakness of the field magnetism at this instant. Devices independent of the motor construction itself have been proposed for avoiding this source of loss by bringing the alternations of magnetism in field and armature to coincidence and a great deal of effort has been expended in reducing other supposed losses in the operations of an alternating current motor. The great and important source of loss is, however, the want of synchronism in the alternations of field and armature, and my present invention consists in eliminating this source of loss by so constructing the field and the armature that their natural times of reversal or inherent magnetic lag or retardation shall be approximately, or as nearly as possible, the same. To this end I decrease the length of the magnetic circuit of the field magnet as well as the number of field coil turns and I increase the size of the armature as much as practicable with a given size of field magnet. By these means I bring down the retardation or lag of the field and increase that of the armature, but while I do not reach the point where absolute synchronism may be obtained, in ordinary constructions of electric motor, I approximate the same and get a largely increased efficiency.

In the accompanying drawings:—Figure 1, is a side elevation of a machine embodying the principles of my invention as hereinbefore set out as well as the other details of construction hereinafter described and more particularly claimed. Fig. 2, is an end elevation of the machine. Figs. 3 and 4, illustrate a modification in the construction of the parts which support the commutator brushes. Fig. 5, is a perspective view of the lubricating brush or rubber detached from the machine.

A, indicates the field magnet which is made up of a number of rather thin plates of iron assembled together to produce the laminated field magnet core which is required for alternating current apparatus. As will be seen the general form of this core is such as to give a magnetic circuit of the least length and the space between the poles thereof is considerably larger than in the usual constructions of continuous current motors, thus allowing space for an armature B, of large size.

$A^2$, indicates the field magnet coils applied as here indicated in two layers of turns only and over a small portion of the field core A, as shown at its middle part. The armature B, is wound as a Siemens armature and preferably with a rather large number of turns of wire to give an increased counter electro-motive force while the small number of turns $A^2$, tend to decrease the counter electro-motive force of the field magnet under the action of the alternating current.

With an armature B, of the diameter of approximately, say, two and three-fourths inches, I find good results obtained by employing three hundred and ninety turns in all of armature wire distributed into ten sections and made up of No. 24 wire.

In a machine proportioned as shown in the drawings and having the diameter of the field magnet on the line X, X, approximately five and three-fourths inches, I find good effects obtained by employing on the field at $A^2$, say ninety-three turns of No. 17 wire. As will be seen by electricians these proportions give a decreased retardation or lag in the field magnet and tend to permit the alternations of field magnetism at the poles thereof to approach synchronism with the alternations of applied electro-motive force. In the same way the construction of the armature tends to increase its natural retardation or lag so as to cause its alternations of magnetism to fall behind those of the applied alternating electro-motive force and to approach therefore the retarded phases of magnetism in the field.

While I have shown one form of motor in which this construction or proportion of parts is employed with the definite end in view of causing the alternations to approach as nearly as possible to coincidence or synchronism in the armature and field, it is obvious that my invention might be realized in other constructions by properly modifying the proportions of field and armature, as hereinafter set forth.

Having described the main feature of my invention, I will proceed to describe other details of the construction of the motor herein illustrated.

C, C, indicates a divided base plate or plate made in two parts and from which the field magnet is supported. Rising from each plate are two standards $C^2$, $C^2$, one for each side or leg of the field magnet A. The plates of the latter are bolted together between the standards $C^2$, of one base plate and those of the opposite base plate C, as indicated, by bolts D, which are, however, insulated from the field magnet by insulation indicated at E. The plate C, having the standards $C^2$, form,—as will be seen, two parts of a field magnet supporting frame which is mounted upon a proper pedestal F, being bolted to the latter as indicated. Flanges or lugs $C^3$, extend from the standards $C^2$, and through them pass set screws $C^4$, adapted to bear against the field magnet core and stay it in position or adjust its pole slightly with relation to the armature.

The armature, whose shaft is indicated at $B^2$, is supported by an independent frame or plate indicated at G, which latter terminates at opposite sides of the field magnet in journal bearing posts, standards or extensions $G^2$. The armature supporting frame thus furnished by the plate G, and its standards extends across beneath the field magnet A, over the space between the two plates C, C, and is preferably bolted directly to the latter thus staying the latter in position.

It will be seen that by this construction the armature and its attached parts may be readily removed from position between the poles of the field magnet complete by simply detaching the plate or frame G, from the base.

The commutator of the machine may be of any desired construction. A simple form has its brushes mounted upon a yoke H, of some insulating material which is sleeved on the armature shaft and carries lateral posts or arms $H^2$, parallel to the armature shaft and upon which are mounted blocks $H^3$, of some conducting material which are split where they embrace the posts and are provided with set screws $H^4$, as indicated, for tightening them upon said posts. Passing through the blocks $H^3$, are springs or arms $H^5$, of some conducting material, which may be set in any longitudinal position by means of screws $H^6$. The free ends of the arms or springs $H^5$, terminate in contact blocks of any desired material adapted to bear on the commutator cylinder. In the present instance these blocks are shown as consisting of carbon blocks $H^7$, held in the springs $H^5$, by simply crimping or compressing the bent ends of said springs upon the carbons.

In place of this construction of commutator, I sometimes employ the form illustrated in Figs. 3 and 4 where each brush supporting arm is shown as consisting of a plate H⁸, bolted to the yoke and extending radially therefrom or in a direction at right angles to the armature shaft and provided with a lateral arm or extension H⁹, parallel to the armature shaft from which in turn extends at right angles or in a direction over the commutator another arm H¹⁰, the terminal of which over the commutator consists of a perforated block H¹¹, through which the block of carbon or other conducting material H¹², may slide, being held in contact with the commutator by means of a spring H¹³, which is attached to some part of the arm.

The terminal binding posts of the machine are indicated at N, N². They are supported respectively upon plates P, P², of some insulating material and which are bolted or secured in any proper way to the standards C². The binding posts N, N² are furnished with proper attachments for making the connections with the field magnet and commutator, and also have the usual fastening nuts R, by which the two feed wires of the circuit supplying the alternating currents may be attached. As shown, the post or body of one binding post N, connects to one terminal of the field magnet A², while the latter is connected with one of the posts or arms supporting a commutator brush. The opposite commutator brush connects as shown by a wire leading to the opposite terminal post of the machine N², thus putting the field and armature in series circuit with one another. The connections may obviously, however, be made to plates for any parallel circuits if desired.

The machine as thus connected up may be run with efficiency from constant potential mains of the usual voltage connected to the terminal posts N, N².

At S, I have shown a lubricating rubber of some absorbent material holding a lubricant and sustained by a suitable arm or support in constant rubbing connection with the commutator cylinder or collecting ring of the machine. As a rubber I prefer to employ a block of felt or similar absorbent adapted to hold a small amount of lubricant without allowing it to flow freely over the surface of the cylinder. This lubricating rubber or block I support in a spring clip formed at S², on the end of an arm S³, which is sustained from the arms H², or some other fixed part of the machine in proper position to hold the lubricating rubber in continuous contact with the commutator cylinder. If the block of absorbent material be moistened with a drop or two of ordinary lubricating oil it will serve to furnish during continuous running of the machine a sufficient amount of lubricant to prevent the cutting of the commutator blocks by the commutator brushes of the machine.

While I have described the use of felt, I do not limit myself to such material but might use a lubricating rubber itself otherwise constructed, but preferably mounted in a support or arm by which it will be allowed to rest in continuous connection with the commutator and to supply, when it has once been moistened, the proper amount of lubricant. By this means I obviate the necessity of periodically applying an oil rag to the commutator by hand which is a troublesome operation and must be very delicately done in order not to apply too much oil to the cylinder. The lubricating rubber described and shown should have the oil applied, preferably, at a point some distance from the commutator cylinder. The latter will be applied in sufficient amount through the absorbent action of the block which by capillary action draws the oil to the surface running upon the commutator.

What I claim as my invention is—

1. In an alternating current motor constructed to have a constant torque in the same direction, the combination, with a commutator, of an armature constructed to have in relation to the alternations of the applied electro-motive force an increased lag or retardation, and a field magnet constructed to have in relation to the alternations of the applied electro-motive force a decreased lag or retardation, as and for the purpose described.

2. The herein described improvement in alternating current motors having a constant torque in the same direction, as described, consisting in the combination of armature and field cores of unequal mass and coils therefor, respectively, of inversely unequal mass of copper to cause an approximation between the alternations in the armature and field.

3. The combination substantially as described, of a field magnet core and supporting frame mounted upon a suitable base, and an armature supporting frame mounted beneath the field magnet but upon the supporting frame for the latter and removable with the armature in place without disturbing the supports for the field magnet.

4. The combination substantially as described, with a field magnet supporting plates C, having the standards or uprights C², of a base plate G, supported upon the plates C, and terminating in journal bearing posts or standards on which the armature of the machine is mounted.

5. The combination substantially as described, with a field magnet core and the supporting standards between which it is bolted, of the set screws C⁴, passing through lugs or flanges extending from said standards, and bearing against the core of the magnet as and for the purpose described.

6. The combination substantially as described, with the uprights or standards supporting the field magnet, of the two plates of insulating material P, P², bolted to the face thereof and carrying the terminal posts of the machine.

7. The combination substantially as described, of the field magnet core, the base plates or blocks C, having uprights C², between which the field magnet core is bolted, and plates P, P², of insulating material attached to said uprights or standards and carrying the main binding posts of the machine to one of which the field magnet coil is directly connected.

8. In a commutator, the combination substantially as described with the brush supporting arms or posts, of the springs $H^5$, of conducting material bent at their outer ends to form clamps and fastened in blocks on the ends of said arms, and brushes of carbon or other conducting material upon which the bent ends of the spring are crimped or compressed.

9. The combination with the commutator or collecting cylinder upon which the conducting brushes bear, of a lubricating rubber, a spring clip for supporting the same, and a clamp for securing said clip to the machine in a position such that said rubber will bear continuously upon the collecting cylinder.

10. The combination with the commutator or collecting cylinder upon which the conductor brushes bear, of a lubricating rubber consisting of a block of felt, a clip for holding the same, and a clamp carrying said clip and secured to one of the brush-carrying arms in a manner to cause said rubber to continuously engage the collecting cylinder.

Signed at New York, in the county of New York and State of New York, this 14th day of July, A. D. 1891.

WILLIAM HOCHHAUSEN.

Witnesses:
WM. H. CAPEL,
THOS. F. CONREY.